United States

Buchan

4,153,335

May 8, 1979

[54] METHOD AND APPARATUS FOR INCREASING THE VISIBILITY OF LOW-CONTRAST IMAGES

[75] Inventor: William R. Buchan, Lincoln, Mass.

[73] Assignee: Itek Corporation, Lexington, Mass.

[21] Appl. No.: 820,524

[22] Filed: Aug. 1, 1977

[51] Int. Cl.$^2$ ............................................. G02B 27/00
[52] U.S. Cl. .................................. 350/150; 250/225; 350/157; 356/71; 356/390
[58] Field of Search ................... 356/71, 168; 250/225; 350/150, 157

[56] References Cited

U.S. PATENT DOCUMENTS

| | | | |
|---|---|---|---|
| 3,517,206 | 6/1970 | Oliver | 250/225 |
| 3,806,897 | 4/1974 | Buchan et al. | 350/150 |
| 3,892,465 | 7/1975 | Micheron et al. | 350/150 |
| 4,005,939 | 2/1977 | Stavalone | 356/168 |

FOREIGN PATENT DOCUMENTS

440736  1/1968  Switzerland ............................. 356/168

*Primary Examiner*—John K. Corbin
*Assistant Examiner*—R. A. Rosenberger
*Attorney, Agent, or Firm*—Homer O. Blair; Robert L. Nathans; Gerald H. Glanzman

[57] ABSTRACT

Method and apparatus for increasing the visibility of low contrast images. In accordance with the invention, the visibility of a selected area of an image is increased relative to another area of said image which differs only slightly in brightness from said selected area by causing said selected area to periodically vary in brightness while maintaining the brightness of said other area constant.

The apparatus for carrying out the invention comprises an optical circuit including an electro-optic photosensitive storage device having a photosensitive characteristic in which the conductance of the device varies as a function of the intensity of the radiation incident upon it, and an electro-optic birefringent characteristic in which the birefringence varies as a function of an electric field applied across it. An image of an object is read into the device which is then read-out onto a screen by placing the device between two polarizers in a readout light beam. Additionally included between the polarizers is an optical retardation means capable of cyclically varying the retardation in the readout path between two chosen values. By cyclically varying the retardation between said chosen values, one area of the output image can be maintained at a constant brightness while all other areas of different original brightness will be caused to cyclically "flicker" above and below the constant brightness level. This "flicker" will make those areas more readily discernible.

12 Claims, 5 Drawing Figures

METHOD AND APPARATUS FOR INCREASING THE VISIBILITY OF LOW-CONTRAST IMAGES

BACKGROUND OF THE INVENTION

1. Field of the Invention

The present invention relates generally to a method and apparatus for increasing the visibility of low-contrast images. More particularly, the present invention relates to a method and apparatus for increasing the visibility of selected areas of an image which differ only slightly in brightness from another area in said image by causing said selected areas to periodically vary in brightness while maintaining the brightness of said other area constant.

2. Description of the Prior Art

The amount of information that can be readily extracted from a photograph or other image is often limited by the low contrast between different areas of the photograph. For example, in aerial photography, as well as in many other applications, a particular object of interest may not be clearly discernible because its brightness level differs only very slightly from that of the surrounding background.

There are a variety of image enhancement techniques available in the prior art which are capable of enhancing the visibility of objects in an image field. However, these techniques are generally quite complex, require the use of large and expensive computers, and are not capable of real-time operation.

SUMMARY OF THE INVENTION

It is well known that if the brightness of an object is caused to change periodically, preferably at a frequency of about 10–12 cycles per second or less, then that object will be visually more arresting than when its brightness level is held constant. The present invention utilizes this effect to examine low contrast images for recognizable features. More specifically, in accordance with the present invention, a method and apparatus is provided by which the brightness level in one part of a photograph or other image is held constant while areas differing slightly in brightness from that level are caused to vary periodically in brightness. By doing this, these areas will be much more noticeable and distinguishable from the constant brightness level area.

Typically, the brightness level of the background area immediately surrounding an object of interest is held constant while the brightness level of the object of interest is periodically varied. Furthermore, the brightness levels associated with the oscillation in brightness of the object of interest are selected to lie, respectively, above and below the constant brightness level of the background such that the visibility of the areas of oscillating brightness due to "flicker" will be the greatest.

In accordance with a presently preferred embodiment of the invention, apparatus for obtaining this "flicker contrast" comprises an optical circuit employing a solid-state rapidly recyclable image storage device known as the Itek PROM. This device, which will be described in greater detail hereinafter, comprises a crystal wafer, the conductance of which may be varied as a function of the radiation incident upon it and the birefringence of which may be varied as a function of the electric field applied across it. The low contrast object to be viewed is imaged onto the Itek PROM which is placed between two polarizers in a readout light beam. Additionally placed between the two polarizers is an optical retardation means capable of cyclically varying the retardation in the readout light path between two chosen values. As will be discussed hereinafter, the optical retardation means may take the form of a variable retardation plate or an electro-optic light modulator placed in the readout light path, or, alternatively, of means for cyclically varying the voltages applied to the Itek PROM.

By applying a voltage to the Itek PROM during exposure to the image of the object, a reversed image of the object will be formed on a screen by the readout light beam. The light intensity on the screen will be a function of the optical retardation in the readout light path. Accordingly, by varying the retardation in the readout light path, as by a retardation plate, the intensity of areas of the output image can be caused to vary. Thus, by properly selecting the retardation values, and by cyclically varying the retardation between said selected values, one area of the output image can be maintained at a constant brightness while all other areas of different brightness will be caused to cyclically flicker above and below the constant brightness level.

Thus, with the present invention, a method and apparatus is provided which will permit a selected area of an image to be maintained at a constant brightness level while areas of different original brightness will be caused to vary cyclically in brightness to permit them to be more readily discerned relative to the area of constant brightness.

The present method is operable in real-time, provides greater flexibility and is less costly than prior image enhancement techniques. Specific details and further features of the invention will be set out more completely hereinafter in conjunction with the detailed description of the preferred embodiments.

DETAILED DESCRIPTION OF THE PREFERRED EMBODIMENTS

Figure 1:
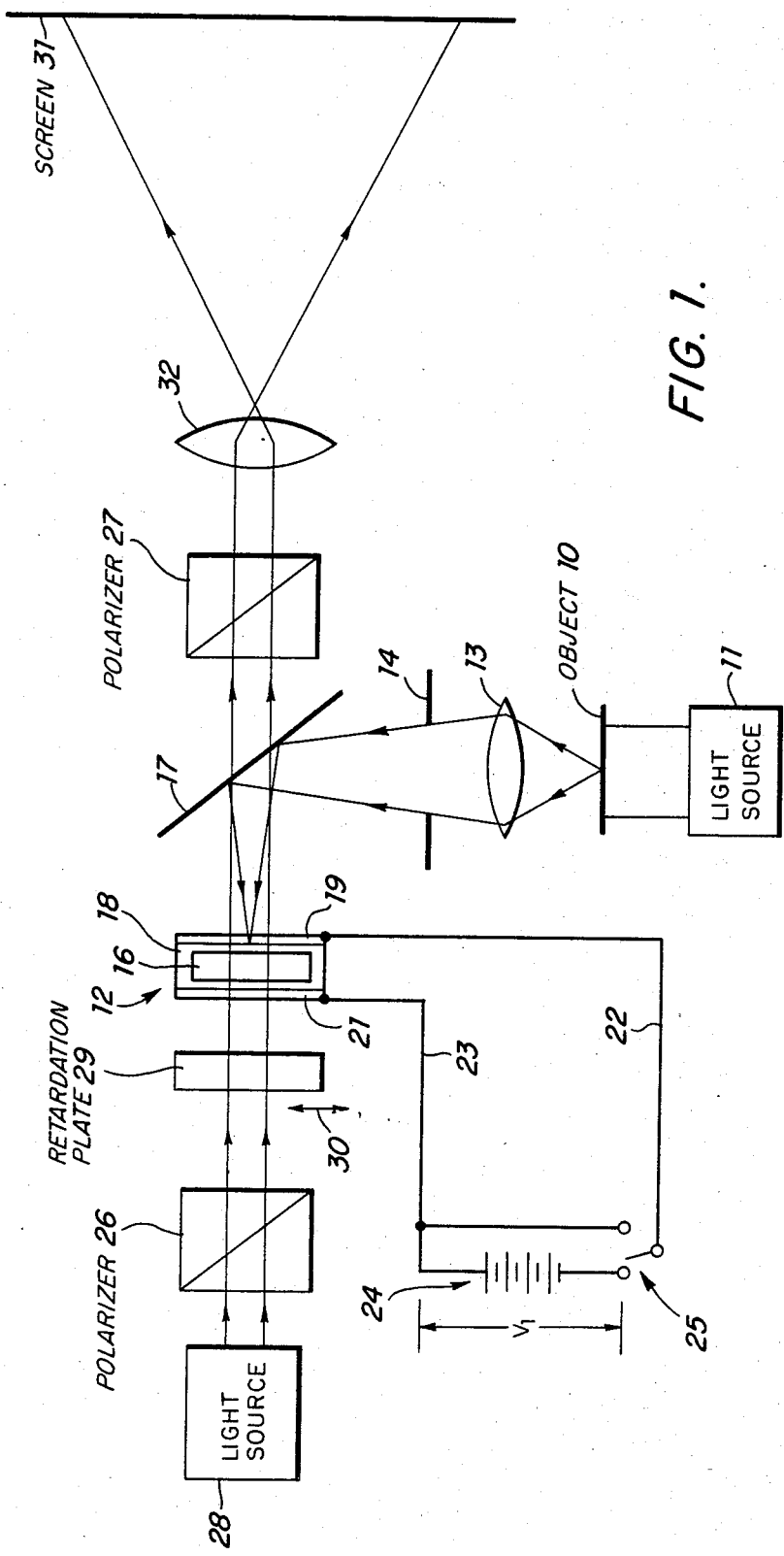
FIG. 1 schematically illustrates an apparatus for increasing the visibility of low contrast images according to a first embodiment of the present invention.

FIG. 1 schematically illustrates an apparatus for increasing the visibility of low contrast images according to one embodiment of the invention. In FIG. 1, the object to be viewed comprises a transparency 10. Obviously, it could just as well comprise a photograph, a photographic negative, or other type of object. Object 10 is illuminated by read-in light source 11 and imaged onto an electro-optic photosensitive storage device 12 by imaging lens 13 via shutter 14 and semi-reflecting mirror 17.

Electro-optic photosensitive storage device 12 is a device which exhibits both the characteristic of photosensitivity and the electro-optic characteristic of induced birefringence, and, preferably, comprises a device known as the Itek PROM. Specifically, the Itek PROM comprises a crystal wafer 16 of, for example, $Bi_{12}SiO_{20}$ (Bisox), the conductance of which may be varied as a function of the radiation incident upon it, and the birefringence of which may be varied as a function of the electric field applied across it. Bisox wafer 16 is a parylene insulating layer 18, while transparent electrodes 19 and 21 are coated on both faces of the insulating layer. Electrical leads 22 and 23 are provided to couple the electrodes to a battery 24 via a switch 25.

The characteristics and operation of the Itek PROM are set out in substantial detail in U.S. Pat. No. 3,517,206 to D. S. Oliver and in U.S. Pat. No. 3,806,897 to W. R. Buchan and D. S. Oliver, and need not be discussed in great detail herein. Suffice it to say that when radiation to which the Itek PROM is sensitive (e.g., blue light) is applied to it, the photosensitivity of crystal wafer 16 will cause its conductance to vary as a function of the intensity of the incident radiation. When the incident radiation is of relatively high intensity, wafer 16 will become highly conductive and the field across it imposed by electrodes 19 and 21 will decrease substantially. When, on the other hand, the incident radiation is of relatively low intensity, the conductance of the wafer will be increased only slightly and the field across it will be decreased only slightly. From this, if the intensity of the incident radiation varies from place to place over the surface of the wafer, the conductance of the wafer will also vary from place to place in like manner as will the electric field across the wafer, and, in this way, an image can be effectively stored in the device as modulation of the stored electric field.

Once an image has been effectively stored in the device, it can be read out in red light by placing the device between crossed polarizers and is playing the variations in birefringence proportional to the residual field in the wafer after exposure. To this end, Itek PROM 12 is placed between crossed polarizers 26 and 27 in a readout light beam from red light source 28. In FIG. 1, readout is achieved by transmission. Readout may also be achieved by reflection, however, in such case, a dichroic reflector must be incorporated into the device as described in the above-mentioned U.S. Pat. No. 3,517,206.

Also included in the optical circuit of FIG. 1 is a variable retardation plate 29. Plate 29 is placed between crossed polarizers 26 and 27 and is capable of cyclically varying the retardation in the readout light path between two chosen values as will be discussed in greater detail hereinafter. Finally, to complete the structure of FIG. 1, the readout light is imaged onto a screen 31 by lens 32.

Figure 2:
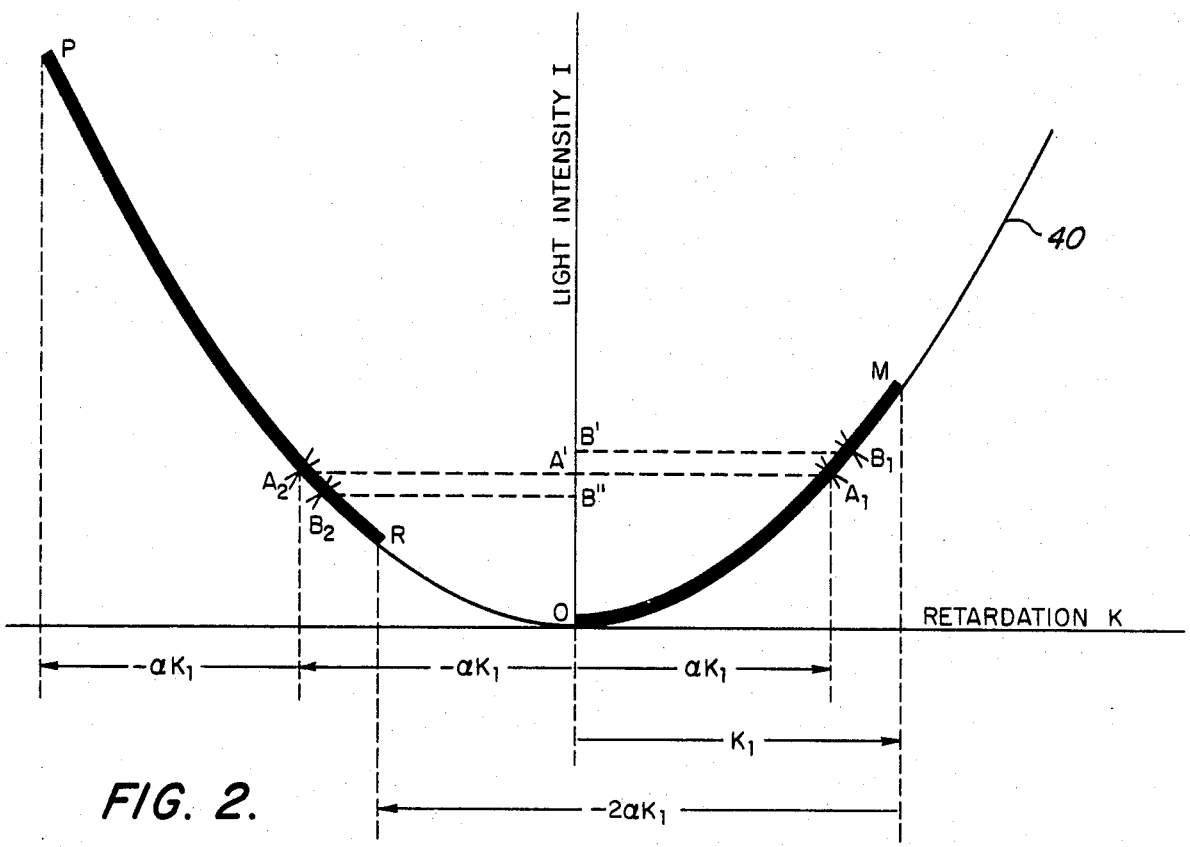
FIGS. 2 and 3 are graphs provided to help explain the present invention.
Figure 3:
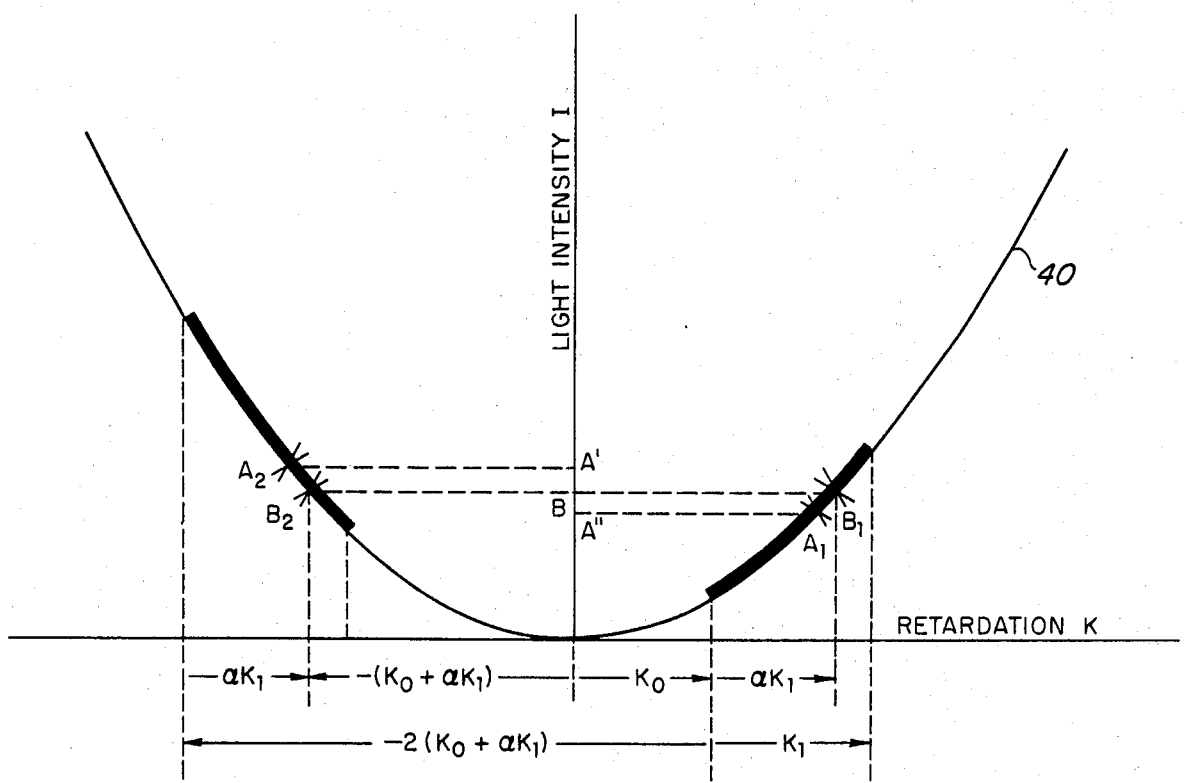

In order to understand how the system of FIG. 1 can be used to increase the contrast of low contrast images, the following discussion is provided with reference to FIGS. 2 and 3.

Initially, by applying a voltage $V_1$ to the device 12 by battery 24 during exposure to the image of the object 10, a reversed image of the object will be formed on the screen 31 by the readout light beam from source 28. The light intensity I on the screen with be given by $$I = I_0 \sin^2\left(\frac{\pi V}{2V_{\lambda/2}}\right)$$

where $I_0$ is the incident light intensity, $V_{\lambda/2}$ is the voltage required for one half wavelength optical retardation and V is the voltage across the electro-optic material at a chosen point on the image.

For applied voltages less than that required to give one quarter wavelength optical retardation, this light intensity I on the screen is approximately given by $$I = C_1 K^2 = C_2 V^2$$

where K is the optical retardation in the device 12, V is the potential across the electro-optic material and $C_1$ and $C_2$ are constants. From this equation, it can be seen that the maximum light intensity on the screen will be due to a maximum retardation $K_1$ associated with the maximum potential across the device, i.e., the potential $V_1$ applied by battery 24. Graphically, this equation can be represented by the parabolic (light intensity versus retardation) curve 40 of FIG. 2 while light intensities on the screen 31 can be represented by points along the segment OM of the curve. For example, Points $A_1$ and $B_1$ in segment OM will represent two areas A and B of the object 10 (FIG. 1) having a small density difference between them. Furthermore, as can be seen in FIG. 2, $A_1$ will be defined by a fraction $\alpha$ of the maximum possible retardation $K_1$; i.e. $\alpha K_1$ defines $A_1$.

Let us now assume that an additional retardation amounting to $-2\alpha K_1$ is introduced into the optical path between polarizers 21 and 22. As can be seen in FIG. 2, the effect of this additional retardation will be to slide the segment OM defining light intensities on the screen 31 around the curve 40 to PR. From the geometry of FIG. 2, it can be seen that the area A of the object corresponding to a retardation in the device of $+\alpha K_1$ and previously represented by $A_1$, will now be represented by $A_2$ with a retardation of $-\alpha K_1$. Furthermore, from FIG. 2, it can also be seen that the light intensity on the screen corresponding to points $A_1$ and $A_2$ representing area A will remain constant at A'. On the other hand, however, it can be seen that area B previously represented by points $B_1$ is now represented by point $B_2$, and that the light intensity on the screen representing area B has changed from B' to B'', with B' being slightly greater in intensity than A' and B'' being slightly lower in intensity than A'. Thus, by repeatedly inserting and removing an additional optical retardation amounting to $-2\alpha K_1$, areas in the object such as B (which are distinguished from area A in the object by only a small intensity difference) will be caused to oscillate in brightness between levels B' and B'', respectively, above and below the constant intensity level A' of area A. The visibility of the difference between areas A and B may therefore by increased by "flicker contrast."

The additional optical retardation introduced in the optical path may be varied from zero to $-2\alpha K_1$ by physically moving a wave plate or a Babinet-Soleil compensator in and out of the light path as indicated by arrow 30 in FIG. 1. Alternatively, variable retardation means 29 can comprise an electro-optic light modulator to which appropriate voltages are applied.

The additional optical retardation introduced into the optical path may also be varied between values other than zero and $-2\alpha K_1$ in order to achieve the desired "flicker contrast." The geometry of FIG. 3 shows that in the general case, the retardation may be varied from $+K_0$ to $-2(K_0+\alpha K_1)$. By selecting the value of $\alpha$, any area of the image may be held at a constant intensity while all areas of different intensity will be caused to flicker.

Figure 4:
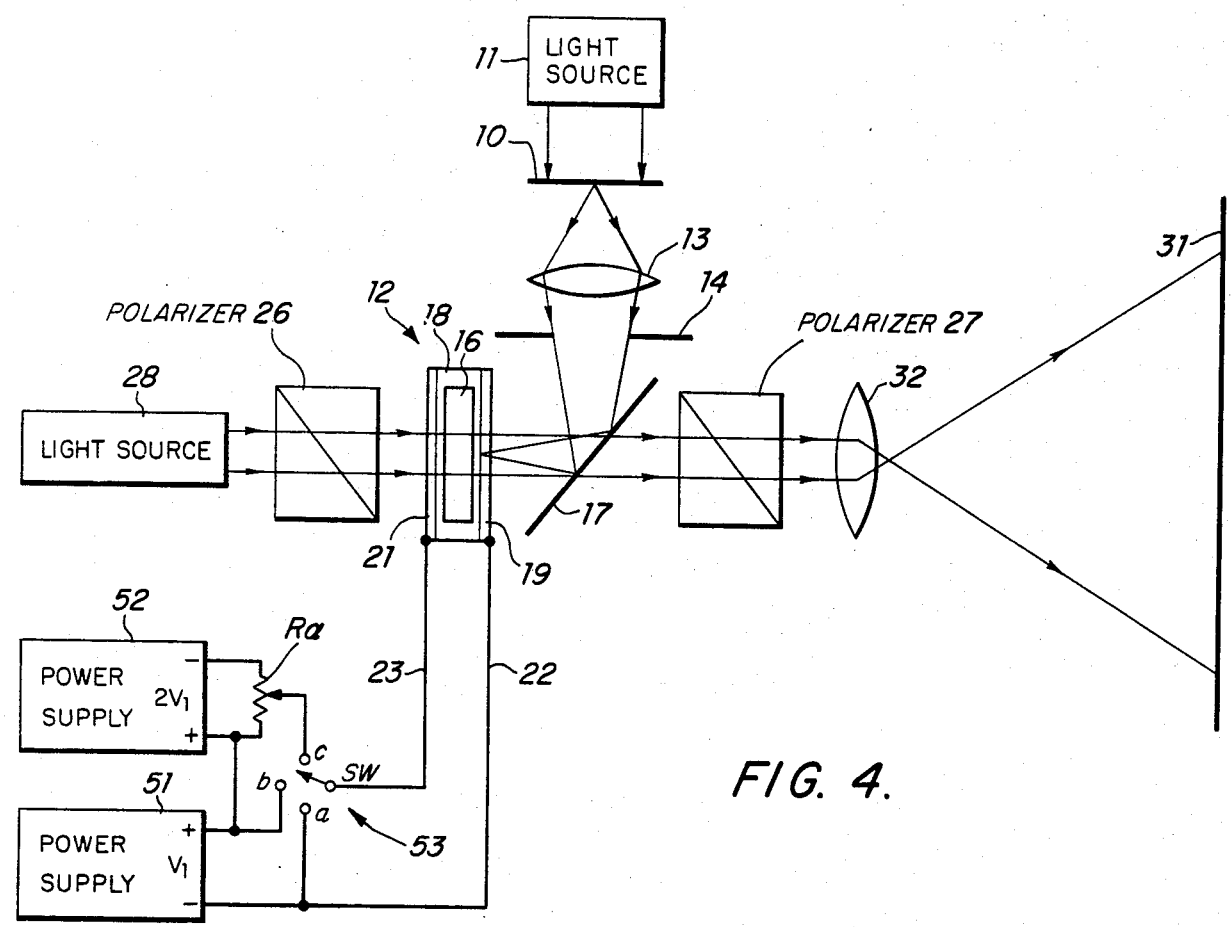
FIGS. 4 and 5 schematically illustrate alternative embodiments of the invention.
Figure 5:
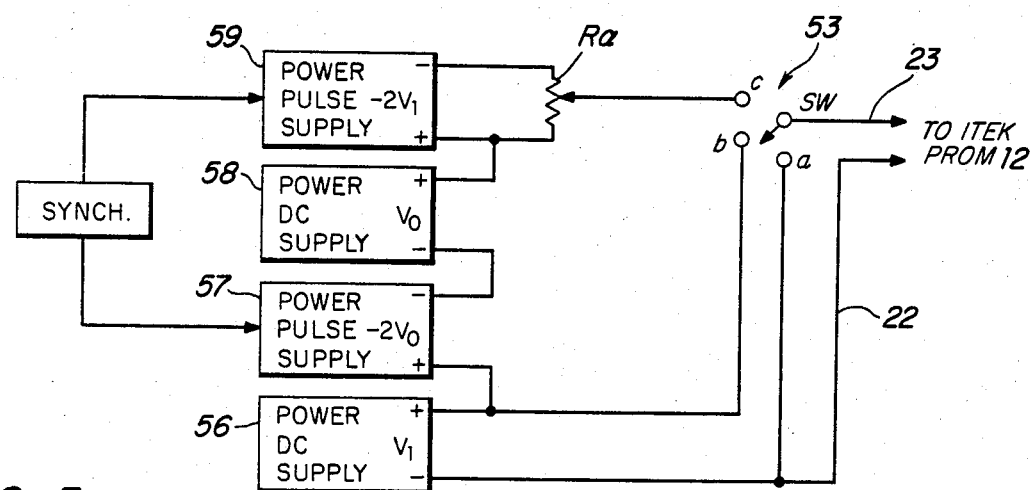

FIGS. 4 and 5 illustrate alternative and presently most preferred embodiments of the invention. These embodiments are preferred because they obviate the necessity of including extra optical components such as the optical retardation plate in the system. Specifically, in the FIGS. 4 and 5 embodiments, the additional optical retardation is obtained by applying suitable voltages directly to the Itek PROM. Specifically, since optical retardation is directly proportional to voltage in the Itek PROM, it is satisfactory to apply cyclically additional voltages of zero and $-2\alpha V_1$ or $V_0$ and $-2(V_0+\alpha V_1)$ to the device. In other words, these cyclically applied voltages are additional to the voltage $V_1$ applied to the device during exposure to the image of the object and during viewing thereafter. In FIG. 4, power supply 51 supplies a D.C. voltage $V_1$ and power supply 52 supplies square pulses at a repetition rate of less than about 10 cycles per second of peak amplitude $2V_1$ and of polarity to oppose $V_1$ from power supply 51. Switch 53 is initially in position a to short-circuit the device during dark adaption. For exposing the device to an image of the object, switch 53 is turned to position b so that voltage $V_1$ is applied. Finally for viewing with "flicker contrast," switch 53 is turned to position c and $R\alpha$ is set to a value which will maintain a chosen part of the image at constant brightness in the display on the screen.

Alternatively, the power supply arrangements of FIG. 4 may be replaced with that shown in FIG. 5. This arrangement will vary the voltage applied to the device, and, therefore, the additional retardation, so as to obtain the mode of operation shown in FIG. 3, i.e., the retardation will be varied cyclically between $+K_0$ and $-2(K_0+\alpha K_1)$, and appropriate power supplies 56-59 are provided for this purpose.

Thus, in summary, the present invention provides apparatus whereby areas of an object which differ only slightly in intensity can be made more readily distinguishable from one another. With the present invention, it becomes a simple matter to select the area of the object which is to be retained at a constant intensity, by trial and error, so that other areas around it will be caused to "flicker". This permits any area of the object to be readily viewed in real-time.

While what has been described are presently most preferred embodiments, it should be understood that the invention could take other forms. Accordingly, the invention should be limited only insofar as required by the scope of the following claims.

I claim:

1. A method for increasing the visibility of a first area of an image which differs in brightness from a second area of said image, said method comprising: periodically varying the brightness level of said first area of said image while maintaining the brightness level of said second area of said image constant.

2. A method as recited in claim 1 wherein said step of periodically varying the brightness level of said first area comprises the step of periodically varying the brightness level of said first area from between a brightness level which is above the brightness level of said second area and a brightness level which is below the brightness level of said second area.

3. A method as recited in claim 2 wherein said step of periodically varying the brightness level of said first area comprises varying the brightness level of said first area at a frequency at or below about 10–12 cycles per second.

4. Apparatus for increasing the visibility of a first area of an object which differs in brightness from a second area of said object, said apparatus comprising:
 a. an electro-optic photosensitive storage device having a photosensitive characteristic in which the conductance of the device varies as a function of the intensity of the radiation incident upon it, and an electro-optic birefringent characteristic in which the birefringence varies as a function of an electric field applied across it;
 b. means for reading an image of said object into said electro-optic photosensitive device; and
 c. means for reading said image out of said electro-optic photosensitive device and for projecting said read-out image onto an image receiving surface, said readout means including:
  (1) means for producing a read-out beam of radiation;
  (2) a pair of polarizer means;
  (3) means for supporting said electro-optic photosensitive device between said pair of polarizer means in said read-out radiation beam; and
  (4) optical retardation means between said polarizer means for cyclically varying the retardation in said read-out radiation beam whereby the brightness of the read-out image of said first area of said object will be caused to cyclically vary while the brightness of the read-out image of said second area of said object will remain constant.

5. Apparatus as recited in claim 4 wherein said optical retardation means includes means for cyclically varying the retardation between two chosen values for causing the brightness level of said read-out image of said first area of said object to cyclically vary in brightness above and below the brightness level of the read-out image of said second area of said object.

6. Apparatus as recited in claim 5 wherein said optical retardation means includes means for cyclically varying the retardation from $+K_0$ to $-2(K_0+\alpha K_1)$ wherein:
 $K_0$ = the minimum retardation associated with the minimum potential across the device and the maximum light intensity on said image receiving surface;
 $K_1$ = the maximum retardation associated with the maximum potential across the device and the minimum light intensity on said image receiving surface; and
 $\alpha$ = a fraction of the maximum retardation whereby $\alpha K_1$ defines said selected value.

7. Apparatus as recited in claim 4 wherien said optical retardation means comprises a variable retardation plate.

8. Apparatus as recited in claim 7 wherein said variable retardation plate comprises a wave plate moveable in and out of said read-out radiation beam.

9. Apparatus as recited in claim 7 wherein said variable retardation plate comprises a Babinet-Soleil compensator moveable in and out of said read-out radiation beam.

10. Apparatus as recited in claim 4 wherein said optical retardation means comprises an electro-optic light modulator.

11. Apparatus as recited in claim 4 wherein said optical retardation means comprises means for cyclically varying the voltage applied to said electro-optic photosensitive device.

12. Apparatus as recited in claim 4 wherein said optical retardation means comprises means for cyclically varying said retardation at or below about 10–12 cycles per second.

* * * * *